(12) United States Patent
Hughes et al.

(10) Patent No.: US 10,439,737 B2
(45) Date of Patent: Oct. 8, 2019

(54) HYPER-ENTANGLED PHOTON SERVER SYSTEM AND ASSOCIATED METHODS

(71) Applicant: GOVERNMENT OF THE UNITED STATES AS REPRESENTED BY THE SECRETARY OF THE AIR FORCE, Rome, NY (US)

(72) Inventors: David H. Hughes, Blossvale, NY (US); Reinhard K. Erdmann, Richfield Springs, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 118 days.

(21) Appl. No.: 15/895,545

(22) Filed: Feb. 13, 2018

(65) Prior Publication Data
US 2018/0241480 A1    Aug. 23, 2018

Related U.S. Application Data

(60) Provisional application No. 62/462,062, filed on Feb. 22, 2017.

(51) Int. Cl.
*H04B 10/85*   (2013.01)
*H04L 9/06*   (2006.01)
(Continued)

(52) U.S. Cl.
CPC ............ *H04B 10/85* (2013.01); *G01J 4/02* (2013.01); *G02B 27/141* (2013.01);
(Continued)

(58) Field of Classification Search
None
See application file for complete search history.

(56) References Cited

U.S. PATENT DOCUMENTS

| | | | |
|---|---|---|---|
| 6,882,384 B1 * | 4/2005 | Sharp | G02B 27/288 349/78 |
| 7,400,448 B2 | 7/2008 | Hutchin | |

(Continued)

OTHER PUBLICATIONS

David H. Hughes et al., "Quantum Operations on Entangled Photons Using Lyot Filters", Oct. 31, 2016, SPIE vol. 9996, 99960H, Quantum Information Science and Technology II, doi: 10.1117/12.2241335 (13 Pages).

(Continued)

*Primary Examiner* — Jennifer D. Carruth
(74) *Attorney, Agent, or Firm* — Joseph A. Mancini

(57) ABSTRACT

A hyper-entanglement photon server (i.e., hub) employs non-degenerate frequencies input as entangled photon pairs into a beam splitter. The beam splitter splits probability amplitudes into two sets of bunched superposition states plus two sets of anti-bunched superposition states. The amplitudes pass through identical Lyot filters and then either enter a polarization beam splitter, where the bunched and anti-bunched states switch identities, or merely advance unchanged to awaiting users at two distinct and spatially-displaced positions (i.e., spokes). The Lyot filters change the output amplitudes from rotationally invariant superpositions of generalized Bell States to rotationally non-invariant superpositions of generalized Bell states. All hubs and spokes pre-share operating key material (a security method called KCQ) that may be continually updated by shared stream ciphers seeded by fresh key material engendered by hub-to-spoke quantum communication.

20 Claims, 6 Drawing Sheets

(51) Int. Cl.
    *G02B 27/14*     (2006.01)
    *G01J 4/02*     (2006.01)
    *G02B 27/28*     (2006.01)
    *H04B 10/70*     (2013.01)
    *G06N 10/00*     (2019.01)
    *G09C 1/00*     (2006.01)
    *H04L 9/08*     (2006.01)

(52) U.S. Cl.
    CPC ......... *G02B 27/283* (2013.01); *G02B 27/288* (2013.01); *G06N 10/00* (2019.01); *G09C 1/00* (2013.01); *H04B 10/70* (2013.01); *H04L 9/0618* (2013.01); *H04L 9/0855* (2013.01)

(56) References Cited

U.S. PATENT DOCUMENTS 7,848,000 B2 * 12/2010 Wang .................. G02B 27/283
                                                                              359/256
2017/0082494 A1 * 3/2017 Hughes .................. G01J 4/04

OTHER PUBLICATIONS

David H. Hughes et al., "Non-local Correlations in a Hyper-Entangled Circuit", Feb. 20, 2017, SPIE vol. 1, 10118-19, 101180J, Advances in Photonics of Quantum Computing, Memory, and Communication, doi: 10.1117/12.2248917 (10 Pages).

* cited by examiner

HYPER-ENTANGLED PHOTON SERVER SYSTEM AND ASSOCIATED METHODS

CROSS REFERENCE TO RELATED APPLICATIONS

This application claims the benefit under 35 U.S.C. § 119(e) of U.S. Provisional Patent Application Ser. No. 62/462,062 filed on Feb. 22, 2017 and titled Quantum Operations On Entangled Photons Using Lyot Filters, the entire content of which is incorporated herein by reference.

GOVERNMENT INTEREST

The invention described herein may be manufactured and used by or for the Government of the United States for all governmental purposes without the payment of any royalty.

FIELD OF THE INVENTION

The present invention relates to the architecture and operation of a secure communication system. More specifically, this invention pertains to devices, systems, and methods for securing free space laser communications applications such as seeding stream ciphers encrypting sensitive data.

BACKGROUND OF THE INVENTION

This invention passively operates on bi-partite input entangled photon pairs for distribution by a server hub to several receiver spokes. These events securely distribute secret key material for network access authentication and replenishing seed keys for stream ciphers that encrypt large sensitive data files. Moreover, deployed within a mesh network of N distinct elements, each element can act as a hub for other elements when so desired.

Referring to FIG. 1, a prior art implementation, specifically the hyperspectral filter 30, was designed by Optical Physics Company and constructed under an Air Force Research Laboratory (AFRL) Small Business Innovative Research (SBIR) contract award, and was solely intended as a network "hub" residing in a geostationary or geosynchronous orbit. The network hub's mission is to support communication links characterized by very high data rates and low probability of detection, interception, and exploitation simultaneously to several users nearer to or on earth over a geographical region roughly the size of the Midwest United States. Such users hereinafter are referred to as "spokes." A hub and spoke network configuration, electromagnetic beams transporting information between the spokes near earth and the hub at geo orbit are comprised of many photons, say in the 1550 nm band. These classical electromagnetic beams are fully describable by classical electrodynamics.

As previously mentioned, an existing patented birefringent spectral filter stage, U.S. Pat. No. 7,400,448, was awarded to Richard Hutchins, Optical Physics Company (OPC) and manifested in SBIR contract FA8750-11-C-0163. The OPC implementation is intended for securing free space laser communications applications where robust wide-angle acceptance in both azimuth and elevation is required. In U.S. Pat. No. 7,400,448, optical signals from the spokes are assigned distinct frequencies in the telecom band and possess common incident polarizations oriented 45° with respect to the optical axis of a set of birefringent spectral plates. As illustrated in FIG. 1, a birefringent filter stage 10 is comprised of the birefringent plates, called a Lyot filter or birefringent stack, (also referred to as birefringent filter stack or filter stack) 10, followed by a polarization beam splitter 20. The polarization beam splitter's 20 plane of incidence is oriented 45° with respect to the birefringent stack 10. It is therefore oriented in concert with the incident beams.

The primary contribution of U.S. Pat. No. 7,400,448 to OPC was to find an innovative way to increase the angular acceptance for simultaneous, multi-access laser communications employing wavelength division multiplexing to distinguish distinct, spatially displaced users. U.S. Pat. No. 7,400,448 incorporates a broadband half-wave plate between two birefringent plates whose extraordinary axes are perpendicular to one another and to the propagation direction of the laser light. Incoming frequencies whose optical path difference phase over the Lyot filter stack is an even integral multiple of $\pi$ will suffer no polarization change in transit through the filter. As used herein, such frequencies are referred to as congruent. However, incoming frequencies whose optical path difference phase is an odd multiple of $\pi$ will suffer polarization rotations by 90°. These frequencies are referred to herein as incongruent. Incoming congruent and incongruent beams are split into orthogonal directions at a polarization beam splitter, or PBS. Thus, the hyperspectral Lyot filter stack prepares incoming beams for spatial separation by the PBS, accomplishing wavelength division multiplexing for classical laser beams. Those classical laser beams initially possess common polarizations preset to be 45° with respect to the Lyot filter reference frame. Their polarizations are, however, coincident with the PBS frame which is oriented 45° with respect to the Lyot filter frame of reference. After exiting the Lyot filter stack, one set of beams, say the congruent set, possess polarizations orthogonal to the PBS plane of incidence; they reflect from the splitting surface. Incongruent beams possess polarizations parallel to the PBS plane of incidence and transmit through the splitter interface.

Another feature of U.S. Pat. No. 7,400,448 is the incorporation of moveable wedges that can tune the optical thickness of the birefringent wedges to select desired transmission frequencies. This function is the primary application U.S. Pat. No. 8,427,769 to Raytheon employs in their Lyot filter tuning device. U.S. Pat. No. 8,427,769 accomplishes a very fine frequency tuning of a laser beam by passing the beam multiple times through the tunable aspect of the wedges deployed in one aspect of the U.S. Pat. No. 7,400,448 to OPC Lyot filter, where again, OPC's filter is not critical to the U.S. Pat. No. 8,427,769 to Raytheon application. The filter is simply one medium to accomplish one function the multi-pass Raytheon patent employs to tune a laser beam to a desired frequency.

Still referring to FIG. 1, distinct input frequencies from the distant spokes are either congruent or incongruent with respect to the filter stack 10. In traversing the filter stack 10, polarization states of congruent frequencies are not rotated, while polarization states of incongruent frequencies are rotated by 90°. The two polarization states possessed by each beam exiting a filter stack 10 are either transmitted or reflected at the splitting interface within the polarization beam splitter 20. In other words, the filter stack 10 prepares incoming beams for splitting into orthogonal directions by the polarization beam splitter 20, thus enabling wavelength division multiplexing (WDM) for simultaneous access between the network "hub" and its spatially distributed "spokes." Moreover, if classical beams comprising a sum of vertical and horizontal polarized states containing many photons of two distinct frequencies are propagating along a line and entering the hyperspectral filter stage 30, one will measure both horizontal and vertical polarized states exiting the beam splitter at both output ports. The beams are a sum of electric field amplitudes comprising many photons. An entangled photon pair state is different; beams are divisible, single photons are not. Yet a pair of single photons generated by interactions at their source, such as four-wave mixing (FWM) in an optical fiber pumped by a sufficiently intense laser pulse, can possess two possible polarization states. They are either both horizontally polarized along the same coordinate axis, or they are both vertically polarized along an orthogonal axis. Both such possibilities are equally probable, but the state is unknown until measurement. Their joint probability quantum amplitude is expressed as a sum of product probability amplitudes, $$|\Gamma(f_1; f_2)\rangle_{in} = \frac{1}{\sqrt{2}}(|f_1, H_1, P_1; f_2, H_2, P_1\rangle + |f_1, V_1, P_1; f_2, V_2, P_1\rangle) \quad (1)$$

Equation (1) expresses the input quantum state as a collinear entangled photon pair prior to entering the hyperspectral filter stage 30 at P1. The term on the left of the plus sign is the probability amplitude that the joint state contains two photons, one with congruent frequency, f1, and one with incongruent frequency, f2. Both are horizontally polarized, and both are incident on port P1 in FIG. 1. The term on the right of the plus sign is the probability amplitude that the joint state contains two photons, one with congruent frequency, f1, and one with incongruent frequency, f2. Both are vertically polarized, and both are collinearly incident on port P1 in FIG. 1. The probability of measuring the product state on the left is the square of the coefficient multiplying it, here equal to ½. Similarly, the probability of measuring the product state on the right is ½.

Polarization measurement entails projection of the state onto detectors wherein the photon's energy is converted into an electrical signal; the photon is destroyed, its energy converted to electricity. In such a process, measurement of horizontal polarization of one photon necessitates horizontal polarization of the other. The measurements are 100% correlated. Likewise, vertical polarization measured on one photon necessitates vertical polarization on the other. Again, measurements are 100% correlated. Either possible outcome of a polarization measurement on the two photons occurs at random and, as stated above, equally probable. In no case is horizontal polarization measured on one photon and vertical polarization measured on the other. These correlations arise from conservation of energy and angular momentum at the source of the photons, and subsequent engineered assurance that both possibilities exist until measurement of the initial state (i.e., by entangling the two possibilities). Assigning logic bit 1 to horizontal polarization and logic bit 0 to vertical polarization, polarization measurements on the entangled state generates a random bit stream, useful for cryptographic purposes and quantum information processing applications. In other words, an entangled polarization state can be a carrier of random numbers which can be securely shared between two parties.

It is important to note that if the photons are split into two distinct directions as a function of frequency, and their polarizations are measured in two non-orthogonal two-dimensional bases oriented relative to one another by 45°, ambiguity is imparted to the value of a logic bit when the two polarization bases are different. For example, in a quantum key distribution (QKD) protocol application where legitimate users share common knowledge of which basis is used in every transmission between them, security is enhanced under intercept and resend attacks by an eavesdropper who does not share the common basis choice. Eavesdroppers will be wrong a discernable fraction of the time, alerting legitimate users of their intrusion. This added security measure is not present in utilization of the frequency for secret key generation in the state given by equation (1).

Frequency measurements of the initial state in equation (1) are not random. They occur in either possible measurement as a deterministic pair. The frequency degree of freedom comprises just one two-dimensional basis, not the two, two-dimensional bases of polarization. In other words, the frequency degree of freedom is not as intrinsically secure as polarization degrees of freedom for random number generation utilized in quantum cryptography.

When congruent frequency f1 and incongruent frequency f2 are both horizontally polarized, transit through the birefringent stack 10 leaves the congruent frequency polarization intact, but rotates the incongruent frequency by 90°, to a vertical polarization state. Or, if the two photons are vertically polarized, again, the congruent frequency photon's polarization state is left intact, remaining vertical, but the incongruent photon's polarization state is rotated from vertical to horizontal polarization. The joint probability amplitude exiting the polarization beam splitter 20, and thus the hyperspectral filter stage 30 becomes, $$|\Gamma(f_1; f_2)\rangle_{out} = \frac{1}{\sqrt{2}}(|f_1, H_1, P_2; f_2, V_2, P_3\rangle + |f_1, V_1, P_3; f_2, H_2, P_2\rangle) \quad (2)$$

Transiting the polarization beam splitter 20, the two photons are directed into two orthogonal directions. The polarization beam splitter 20 is a projection operator. Horizontal polarizations exit P3 in FIG. 1 and vertical polarizations exit P2. Polarization measurements of a photon exiting P3 are no longer randomly distributed, nor are polarization measurements exiting P2. Thus, the polarization randomness of the input state given in equation (1) is lost upon projection and subsequent measurement. In terms of information utility, they behave like the frequency behaves prior to entering the hyperspectral filter stage 30 (i.e., like one two-dimensional basis without randomness). Frequency measurements, however, are random. After transiting the hyperspectral filter stage 30, they can provide anti-correlated random bit streams at either port. If the output of P2 is f1, the output of P3 is f2, and vice versa.

Useful polarization entanglement is lost and replaced by less useful frequency entanglement. The difference in utility is the fact that polarization entanglement allows for measuring in at least two, two-dimensional bases, while frequency entanglement allows measurement in only one two-dimensional basis. For quantum key distribution purposes, two non-orthogonal two-dimensional bases allow ambiguity in an eavesdropper's interpretation of the logical meaning of their measurements. One two-dimensional frequency basis does not allow such ambiguity to be imparted to an eavesdropper. It is therefore desirable to modify the single hyperspectral filter stage 30 to recover the more intrinsically secure polarization entanglement.

A need exists for a hyper-entanglement photon server employing non-degenerate frequencies input as entangled photon pairs additionally utilizing polarization entanglement as a cypher basis in hub-to-spoke quantum communication.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a method for creating measurements of photons at distinct locations, comprising receiving, using a non-polarizing beam splitter (BS), electromagnetic (EM) radiation comprising a hyperentangled photon pair, defined as a first photon and a second photon entangled in a plurality of degrees of freedom including polarization, frequency, and path, wherein frequency is non-degenerate, spatially separating, using the BS, output probability amplitudes for the non-degenerate frequencies of the hyperentangled photon pair into a first set of anti-bunched rotationally invariant amplitude states and a second set of bunched rotationally invariant amplitude states, and rotating, using a first Lyot filter, the respective polarization of incongruent frequency states in the first set of anti-bunched rotationally invariant amplitude states, to define a first set of anti-bunched non-rotationally invariant amplitude states. The method may further comprise preserving, using the first Lyot filter, the respective polarization of congruent frequency states in the first set of anti-bunched rotationally invariant amplitude states, to further define the first set of anti-bunched non-rotationally invariant amplitude states, spatially separating, using a first dichroic mirror (DM), the first set of anti-bunched non-rotationally invariant amplitude states by the non-degenerate frequencies of the hyperentangled photon pair, to define a first linear polarized wave and a second linear polarized wave, and passing in line, using a first polarizing beam splitter (PBS), a first subset of photons from the first linear polarized wave, each having a polarization aligned with the first PBS. Furthermore, the method may comprise reflecting orthogonally, using the first PBS, a second subset of photons from the first linear polarized wave, each having a polarization unaligned with the first PBS, and measuring, using a first polarization analyzer, the respective polarization of at least one of the first subset of photons and the second subset of photons.

In some embodiments, rotating the polarizations may comprise rotating, using the first Lyot filter, the respective polarization of the incongruent frequency states in the first set of anti-bunched rotationally invariant amplitude states by 90 degrees. In some embodiments, measuring the polarizations may comprise determining a first photon correlation state, defined as one of 100% correlation and 100% anti-correlation between the respective polarizations of the first subset of photons and the second set of photons. In some embodiments, the method may further comprise passing in line, using a second polarizing beam splitter (PBS), a third subset of photons from the second linear polarized wave, each having a polarization aligned with the second PBS, reflecting orthogonally, using the second PBS, a fourth subset of photons from the second linear polarized wave, each having a polarization unaligned with the second PBS, and measuring, using a second polarization analyzer, the respective polarization of at least one of the third subset of photons and the fourth subset of photons.

In some embodiments, the method may further comprise rotating, using a second Lyot filter, the respective polarization of congruent frequency states in the second set of bunched rotationally invariant amplitude states, to define a second set of bunched non-rotationally invariant amplitude states, preserving, using the second Lyot filter, the respective polarization of congruent frequency states in the second set of bunched rotationally invariant amplitude states, to further define the second set of bunched non-rotationally invariant amplitude states, and spatially separating, using a second dichroic mirror (DM), the second set of bunched non-rotationally invariant amplitude states by the non-degenerate frequencies of the hyperentangled photon pair, to define a third linear polarized wave and a fourth linear polarized wave. Additionally, the method may further comprise passing in line, using a third polarizing beam splitter (PBS), a fifth subset of photons from the third linear polarized wave, each having a polarization aligned with the third PBS, reflecting orthogonally, using the third PBS, a sixth subset of photons from the third linear polarized wave, each having a polarization unaligned with the third PBS, and measuring, using a third polarization analyzer, the respective polarization of at least one of the fifth subset of photons and the sixth subset of photons. Furthermore, the method may additionally comprise passing in line, using a fourth polarizing beam splitter (PBS), a seventh subset of photons from the fourth linear polarized wave, each having a polarization aligned with the fourth PBS, reflecting orthogonally, using the fourth PBS, an eighth subset of photons from the fourth linear polarized wave, each having a polarization unaligned with the fourth PBS, and measuring, using a fourth polarization analyzer, the respective polarization of at least one of the seventh subset of photons and the eighth subset of photons.

Additionally, embodiments of the present invention are directed to a linear optical quantum computing (LOQC) system comprising a hub server that includes a non-polarizing beam splitter (BS) configured to receive electromagnetic (EM) radiation comprising a hyperentangled photon pair, defined as a first photon and a second photon entangled in a plurality of degrees of freedom including polarization, frequency, and path, wherein frequency is non-degenerate, and spatially separate output probability amplitudes for the non-degenerate frequencies of the hyperentangled photon pair into a first set of anti-bunched rotationally invariant amplitude states and a second set of bunched rotationally invariant amplitude states. The hub server may further comprise a first Lyot filter configured to rotate the respective polarization of incongruent frequency states in the first set of anti-bunched rotationally invariant amplitude states and preserve the respective polarization of congruent frequency states in the first set of anti-bunched rotationally invariant amplitude states, to define a first set of anti-bunched non-rotationally invariant amplitude states. Additionally, the hub server may comprise at least one spoke client comprising a dichroic mirror configured to spatially separate the first set of anti-bunched non-rotationally invariant amplitude states by the non-degenerate frequencies of the hyperentangled photon pair, to define a first linear polarized wave and a second linear polarized wave, a polarizing beam splitter (PBS) configured to pass in line a first subset of photons from the first linear polarized wave, each having a polarization aligned with the PBS, and reflect orthogonally a second subset of photons from the first linear polarized wave, each having a polarization unaligned with the PBS, and a polarization analyzer configured to measure the respective polarization of at least one of the first subset of photons and the second subset of photons.

In some embodiments, the first Lyot filter may be configured to rotate the respective polarization of the incongruent frequency states in the first set of anti-bunched rotationally invariant amplitude states by 90 degrees.

In some embodiments, the respective polarization analyzer of the at least one spoke client may be configured to determine a first photon correlation state, defined as one of 100% correlation and 100% anti-correlation between the respective polarizations of the first subset of photons and the second set of photons.

In some embodiments, the hub server may further comprise a second Lyot filter configured to rotate the respective polarization of congruent frequency states in the second set of bunched rotationally invariant amplitude states and preserve the respective polarization of congruent frequency states in the second set of bunched rotationally invariant amplitude states, to define a second set of bunched non-rotationally invariant amplitude states. The respective dichroic mirror of the at least one spoke client may further be configured to spatially separate the second set of bunched non-rotationally invariant amplitude states by the non-degenerate frequencies of the hyperentangled photon pair, to define a third linear polarized wave and a fourth linear polarized wave. Additionally, the respective PBS of the at least one spoke client may further be configured to pass in line a third subset of photons from the third linear polarized wave, each having a polarization aligned with the PBS and reflect orthogonally a fourth subset of photons from the third linear polarized wave, each having a polarization unaligned with the PBS; and. Furthermore, the respective polarization analyzer of each of the at least one spoke client may be further configured to measure the respective polarization of at least one of the third subset of photons and the fourth subset of photons.

In some embodiments, at least one of the plurality of spoke clients may be configured to determine a bit stream using the photon correlation state, wherein the 100% correlation represents a '1' in the bit stream and the 100% anti-correlation represents a '0' in the bit stream.

In some embodiments, the LOQC system may further comprising a tunable entangled pair source configured to generate the EM radiation. The tunable entangled pair source may be a pump beam passing through a fiber.

In some embodiments, the hub server may further comprise a transceiver and an information processing and control (IPC) module. The transceiver may be of a type selected from the group consisting of classical (C) and quantum (Q).

In some embodiments, the EM radiation is of an electromagnetic radiation type selected from the group consisting of radio waves, microwaves, infrared, visible light, ultraviolet (UV), X-, and gamma radiation.

Furthermore, embodiments of the present invention are directed to a hub server apparatus comprising a non-polarizing beam splitter (BS) including a first output, a second output, and an input comprising a first port and a second port, wherein the BS is configured to receive, using the input of the BS, a hyperentangled photon pair, defined as a first photon and a second photon entangled in a plurality of degrees of freedom including polarization, frequency, and path, wherein frequency is non-degenerate, and spatially separate output probability amplitudes for the non-degenerate frequencies of the hyperentangled photon pair into a first set of anti-bunched rotationally invariant amplitude states and a second set of bunched rotationally invariant amplitude states. The hub server apparatus may further comprise a first Lyot filter optically coupled with said first output and a second Lyot filter optically coupled with said second output, wherein the first and second Lyot filters are configured to rotate the respective polarization of incongruent frequency states in the first set of anti-bunched rotationally invariant amplitude states and preserve the respective polarization of congruent frequency states in the first set of anti-bunched rotationally invariant amplitude states, to define a first set of anti-bunched non-rotationally invariant amplitude states, and rotate the respective polarization of congruent frequency states in the second set of bunched rotationally invariant amplitude states and preserve the respective polarization of congruent frequency states in the second set of bunched rotationally invariant amplitude states, to define a second set of bunched non-rotationally invariant amplitude states.

In some embodiments, the hub server apparatus may further comprise a polarizing beam splitter (PBS) having a first input, a second input, a first output and a second output, wherein said first and second inputs of the PBS are orthogonal to each other and wherein said first and second outputs of the PBS are orthogonal to each other; and wherein the PBS is configured to transform the first set of anti-bunched non-rotationally invariant amplitude states to a first set of bunched non-rotationally invariant amplitude states, and transform the second set of bunched non-rotationally invariant amplitude states to a second set of anti-bunched non-rotationally invariant amplitude states.

Furthermore, the hub server apparatus may comprise a second PBS configured to receive a signal having a different frequency than a signal received by a first PBS. Additionally, the hub server apparatus may further comprise first and second digital signal processors receiving the output of the first and second PBS, respectively. The output of the first and second digital signal processors may output to a process/transmit device.

DETAILED DESCRIPTION OF THE INVENTION

Figure 1:
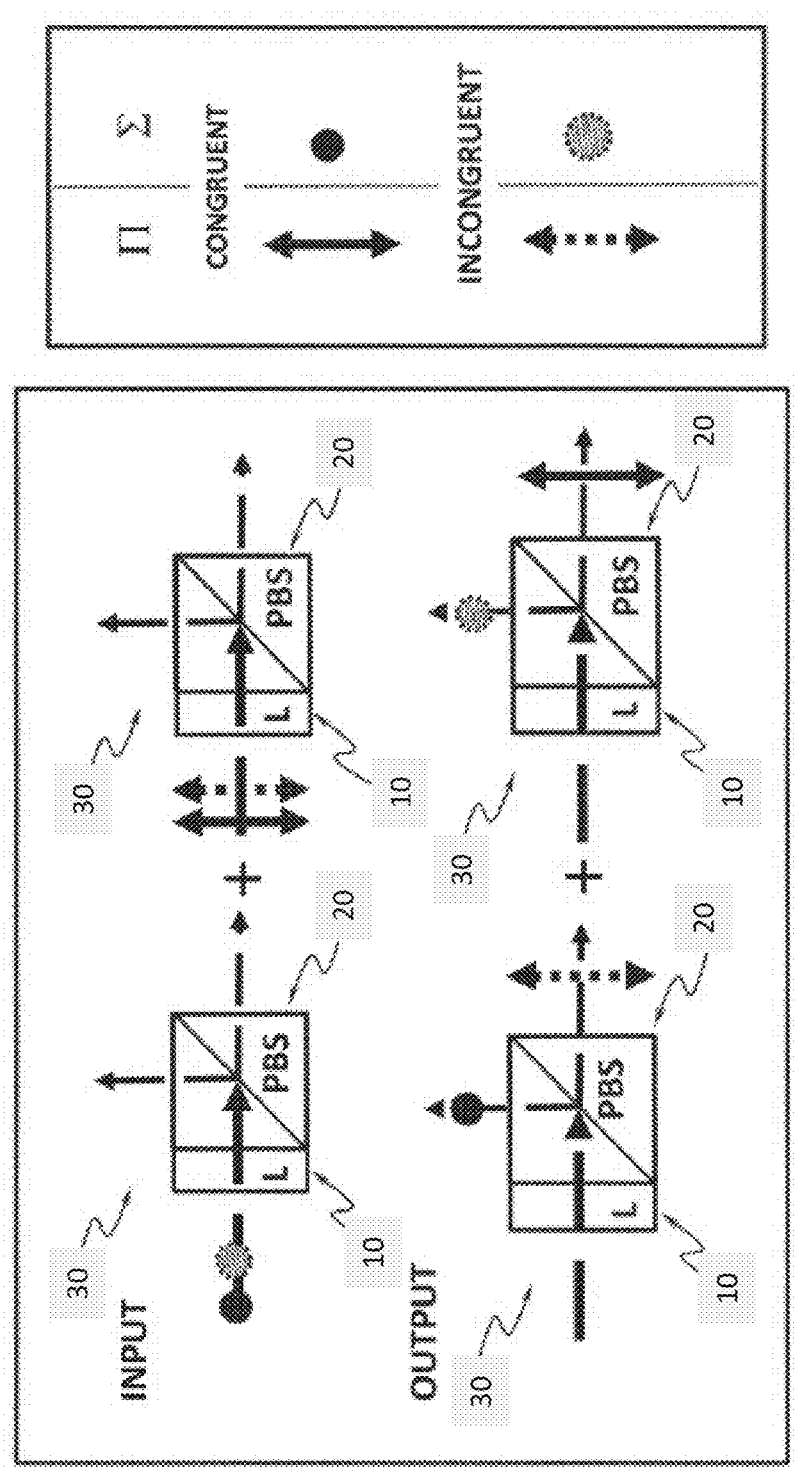
FIG. 1 is a schematic block diagram of a hyperspectral birefringent filter known in the prior art.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 2A, 2B, 3, 4, and 5, embodiments of the present invention may passively operate on bi-partite input entangled photon pairs for distribution by a server hub to several receiver spokes. These events may securely distribute secret key material for network access authentication and for replenishment of seed keys for stream ciphers that encrypt large sensitive data files. Moreover, deployed within a mesh network of N distinct elements, each element may act as a hub for other elements when so desired.

One embodiment of the present invention may consider non-classical electromagnetic photon propagation through a hyperspectral filter stage involving just two photons that are entangled in path, frequency, and polarization. These are degrees of freedom specifying the two-photon radiation field requiring a quantum description. Entanglement is a quantum phenomenon allowing secure transport of random bit streams via confidential correlation of measurement outcomes between users. In the absence of loss, the hyperspectral filter stage of the present invention may ensure 100% correlation or anti-correlation of polarization measurements between the two photons exiting the hyper-entangled photon server. Measuring 100% correlation or 100% anti-correlation is a choice made by the users and is integral to the security of the shared key bits engendered. The present invention may advantageously be used to provide a capability to re-key intelligence, surveillance and reconnaissance (ISR) and kinetic combat assets in military applications at not so great a distance as Geo-to-Earth links, though these latter long-range applications are not necessarily precluded. Alternatively, or in addition, the present invention may advantageously support rapid and remote "last mile" rekeying of assets at much shorter ranges, for example, and without limitation, above a flight deck or tarmac full of aircraft awaiting launch, or armored columns and dismounted troops readying for operations.

The hyper-entangled photon server of the present invention may be distinguished from typical existing secret key distribution systems utilizing quantum phenomena, at least, whereas the typical extant systems utilize rotationally invariant quantum entangled states, the present invention utilizes non-rotationally invariant states. These non-rotationally invariant states may be engendered by use of Lyot filters acting on non-degenerate frequencies that may be produced, for example, and without limitation, by a four-wave mixing process in standard optical fibers pumped by bright source lasers.

Frequencies of electromagnetic modes, wherein the optical path length difference in traversing the Lyot imparts an even multiple of $2\pi$ to their phases, may suffer no effective polarization shift. As described above, these frequencies are termed congruent frequencies. Incongruent frequencies, on the other hand, incur an odd multiple of $\pi$ phase shifts. Their polarizations suffer a $\pi/2$ rotation, as if they are passing through a half-wave plate. When incident upon a polarization beam splitter (PBS), linear polarized waves parallel to the plane of incidence may be transmitted through the PBS. Those whose linear polarization is orthogonal to the plane of incidence may be reflected. In this way, the frequencies may be separated.

Certain embodiments of the invention, as shown and described by the various figures and accompanying text, may overcome the problems in the art described above by delivering the following advantages, as described in more detail herein below:

As a matter of definition, probability amplitude is a representation of a possible state in which a photon exits as measured by the degrees of freedom listed within its "wave function." As used herein, wave functions are synonymous with probability amplitude. The squared modulus of the wave functions yields the probability density function.

The degrees of freedom may be assigned slots in the tensor product that are either occupied or not, "1" or "0." (Note: The tensor product of two vector spaces V and W, denoted V⊗W and also called the tensor direct product, is a way of creating a new vector space analogous to multiplication of integers.) These eventualities occur at random, but the present invention may exploit entanglement between polarization and frequency to gain greater control over that information flow which is measurable.

The measurable properties of the photon may be used to transport information in the form of bit streams. In embodiments of the present invention, those bit streams are random. Rather than use occupation numbers to encode the information so much as assigning logic to the values measured; s=1, p=0, a=1, b=0, etc., the present invention may allow for standard permutations to operate on those values after they are stored. Such post processing may occur in their separate locations, a or b, by a predetermined, shared transformation. Consequently, the cybersecurity of the host in which the raw, shared bit streams are sifted from the transport requires ultimate security.

The permutations may be triggered at random under some rule, by the random arrival of both photons at the same location, a or b.

Keyed communication in quantum noise entails predetermining a choice of measuring basis among users who share a key given them in a trusted location. In such a communication implementation, the users share a measurement advantage over an eavesdropper, and, therefore, an information advantage over the eavesdropper. The eavesdropper may be expected to blindly make mistakes in measurement because, while the users share knowledge of the basis within which to measure, the eavesdropper does not. If an eavesdropper executes an intercept/resend attack on one leg of a communication transmission in an attempt to gain the knowledge to be shared by the legitimate users, the eavesdropper predictably will make errors and, as a result, disrupt expected correlations the legitimate users perform. Due to the disruption, the eavesdropper's activity may be discovered in the users' error rate analysis.

The measurement bases legitimate users employ may be predetermined and not necessarily shared with the server, unless the server is in the user network. The users may share a principal frame of reference or basis with the server, and may use it to execute further rotations on the photons the user nodes receive. How the initial sharing is done between all members may be either some standard quantum key distribution (QKD), or may be distributed classically in a secure environment. Once initiated and used, control keys may be replenished (e.g., just like standard QKD protocols). These authentication procedures are known in the art, with the exception of QKD engendered initial keys.

Figure 2A:
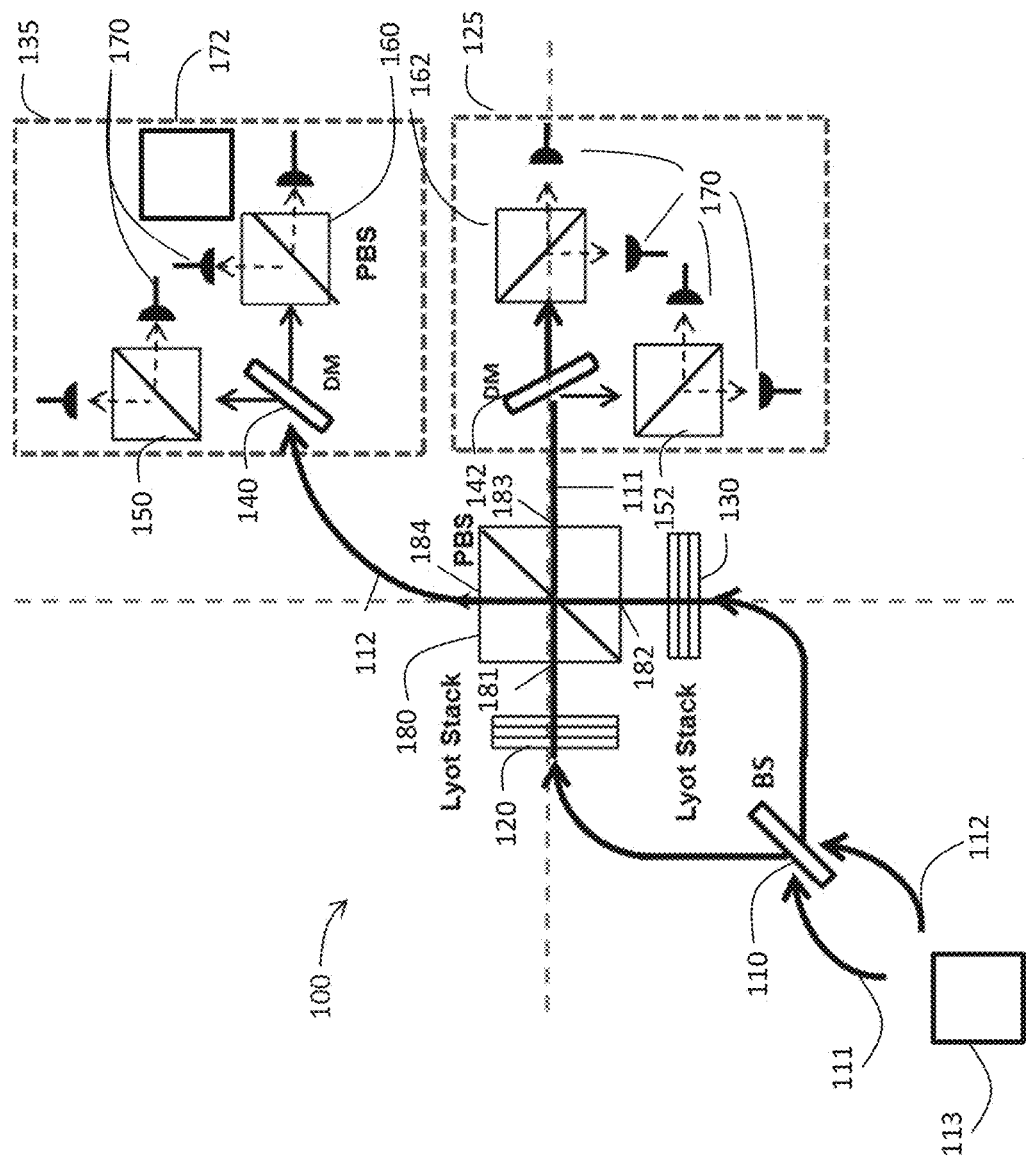
FIG. 2A is a schematic block diagram of a first exemplary quantum computer system employing hyperentangled photons according to an embodiment of the present invention.

Referring now to FIG. 2A, and more specifically, embodiments of the present invention may be generally characterized by a hub server 100 and some number of user spoke clients 125, 135. In combination, the hub server 100 and the user spoke clients 125, 135 may be understood as a linear optical quantum computing (LOQC) system. Regarding applicable authentication reference frames, as described above, the hub server 100 and user spoke clients 125, 135 may share a common primary reference frame. While two user spoke clients are depicted in FIG. 2A, this is exemplary only and any number of user spoke clients is contemplated and included within the scope of the invention. The hub server 100 may rotate output state in plane orthogonal to propagation direction prepares state in new reference frame: D→Dd for use by spokes.

The hub server 100 may comprise a non-polarizing beam splitter (NBS) 110. The NBS 110 may be operable to receive EM radiation and spatially separate bunched and anti-bunched output probability amplitudes of a hyperentangled photon pair. More specifically, the NBS 110 may be operable to receive EM radiation comprising a pair of photons 111, 112 at respective first and second ports. The EM radiation may be any EM radiation type including, but not limited to, EM radiation within a radio frequency range, a microwave frequency wave, an infrared frequency range, a visible light frequency range, and ultraviolet frequency range, an x-ray frequency range, and a gamma radiation frequency range.

The pair of photons 111, 112 may be hyper-entangled by a plurality of degrees of freedom, including, but not limited to, frequency, polarization, and path. In some embodiments, the frequency degree of freedom may be non-degenerate. Upon receiving the hyperentangled pair of photons 111, 112, the NBS 110 may separate the photons 111, 112 such that output probability amplitudes for the non-degenerate frequencies of the photons 111, 112 are separated into a first set of anti-bunched rotationally invariant amplitude states and a second set of bunched rotationally invariant amplitude states. Such spatial separation may be imparted as a result of the outputting of the photons 111, 112 at first and second outputs of the NBS 110.

In some embodiments, the LOQC system may comprise a tunable entangled pair source 113 operable to generate the EM radiation described hereinabove. In some embodiments, the tunable entangled pair source 113 may be a pump beam positioned in optical communication with one or more optical fibers, which are in turn in optical communication with the NBS 110.

State descriptions are given in terms of spectral components that are possibly emitted in energy conserving pairs by a pump beam passing through a fiber. In addition to the frequency constraints on the output photons, their polarizations are also constrained by momentum conservation to be either both horizontally polarized or both vertically polarized in some rotationally invariant state. In other words, both possibilities are equally probable. Representation of a spectral state is given in equation 1 below. The output from a tunable source, such as NuCrypt LLC's entangled photon source [2], can be split by polarization into the two possibilities as shown in FIG. 2A entering the BS. The input state representation in the Schrodinger picture is then, $$|\Psi_{in}\rangle = \frac{1}{\sqrt{2}}(|S_1, 0, b\rangle|S_2, 0, b\rangle + |P_1, a, 0\rangle|P_2, a, 0\rangle). \quad \text{Equation 1}$$

Polarization degrees of freedom are denoted S and P for polarization perpendicular and parallel respectively to the plane of incidence on the relevant linear optical element. Here frequencies are implicit, but are signified by congruent (1) and incongruent (2). Generalized coordinates (a) and (b) are used throughout. They could indicate position at the linear optical element or direction of propagation by Fourier transformation in the spatial mode. This modeling is based on discrete time representations of quantum operations on quantum states. Equation 1 represents the joint probability amplitude for an entangled quantum state comprised of two photons, one with frequency signified by 1, the other by 2, and both with polarization S at position b, or both with polarization P at position a.

Because the photons 111, 112 are distinguishable by their distinct but constrained frequencies, eight amplitudes, four bunched and four anti-bunched, are generated by the NBS 110, as shown in equation 2:

$$\Psi_{>BS} = \pm \begin{pmatrix} \frac{1}{2\sqrt{2}} \begin{Bmatrix} |S_1, a, 0\rangle|S_2, a, 0\rangle + |P_1, a, 0\rangle|P_2, a, 0\rangle + \\ |S_1, 0, b\rangle|S_2, 0, b\rangle + |P_1, 0, b\rangle|P_2, 0, b\rangle \end{Bmatrix} - \\ \frac{1}{2\sqrt{2}} \begin{Bmatrix} |S_1, a, 0\rangle|S_2, 0, b\rangle + |P_1, a, 0\rangle|P_2, 0, b\rangle + \\ |S_1, 0, b\rangle|S_2, a, 0\rangle + |P_1, 0, b\rangle|P_2, a, 0\rangle \end{Bmatrix} \end{pmatrix} \quad \text{Equation 2}$$

The hub server 100 may further comprise first and second Lyot filters 120, 130. The first Lyot filter 120 may be optically coupled to the first output of the NBS 110 and the second Lyot filter 130 may be optically coupled to the second output of the NBS 110. As described above, if the frequency of either of the first or second photons 111, 112 whose optical path difference phase over the Lyot filters 120, 130 is an even integral multiple of $\pi$, there will be no polarization change to the photon in transit through the filter. However, if the frequency of either of the first or second photons 111, 112 whose optical path difference phase is an odd multiple of $\pi$ will have imparted thereto a polarization rotation of 90 degrees. Accordingly, the polarization of incongruent frequency states of the first set of anti-bunched rotationally invariant amplitude states will be rotated 90° by the first Lyot filter 120 defining a first set of anti-bunched non-rotationally invariant amplitude states and the polarization of congruent frequency states of the first set of anti-bunched rotationally invariant amplitude states will be preserved, further defining the first set of anti-bunched non-rotationally invariant amplitude states. Similarly, the polarization of incongruent frequency states of the second set of bunched rotationally invariant amplitude states will be rotated 90 degrees by the second Lyot filter 130 defining a second set of bunched non-rotationally invariant amplitude states and the polarization of congruent frequency states of the second set of bunched rotationally invariant amplitude states will be preserved, further defining the second set of bunched non-rotationally invariant amplitude states.

The hub server 100 may further comprise a polarizing beam splitter (PBS) 180. The PBS 180 may comprise first and second inputs 181, 182 and first and second outputs 183, 184. The first and second inputs 181, 182 of the PBS 180 may be orthogonal to another, and the first and second outputs 183, 184 of the PBS 180 may be orthogonal to one another. The PBS 180 may be operable to transform the first set of anti-bunched non-rotationally invariant amplitude states to a first set of bunched non-rotationally invariant amplitude states. Additionally, the PBS 180 may be operable to transform the second set of bunched non-rotationally invariant amplitude states to a second set of anti-bunched non-rotationally invariant amplitude states.

Passing through the PBS 180 in FIG. 2A, the amplitudes of the photons 111, 112 remain bunched and anti-bunched, but are simply switched one for one as discussed above. Hence the relative sign change in the above equation 2, why the plus or minus precedes the amplitudes.

The user spoke clients 125, 135 may be optically coupled to the first and second outputs 183, 184 of the PBS 180. More specifically, user spoke client 125 may be optically coupled to the first output 183 of the PBS 180 and user spoke client 135 may be optically coupled to the second output 184 of the PBS 180.

The user spoke clients 125, 135 may comprise respective dichroic mirrors. More specifically, user spoke client 135 may comprise a first dichroic mirror 140 and user spoke client 125 may comprise a second dichroic mirror 142. The dichroic mirrors 140, 142 may be configured to preserve polarization to distinguish incoming frequencies. Accordingly, the first dichroic mirror 140 may be configured to spatially separate the first set of anti-bunched non-rotationally invariant amplitude states by the non-degenerate frequencies of the hyperentangled photons 111, 112, thereby defining a first linear polarized wave and a second linear polarized wave, and the second dichroic mirror may be configured to spatially separate the second set of bunched non-rotationally invariant amplitude states by the non-degenerate frequencies of the hyperentangled photons 111, 112, thereby defining a third linear polarized wave and a fourth linear polarized wave.

The user spoke clients 125, 135 may further comprise respective at least one polarizing beam splitters (PBS), specifically, user spoke client 135 may comprise a first PBS 150 and a second PBS 160 optically coupled to the dichroic mirror 140 and further optically coupled to one or more polarization analyzers 170. The first PBS 150 may be configured to pass in line a first subset of photons from the first linear polarized wave. The first subset of photons may have a polarization that is aligned with the first PBS 150. The first PBS 150 may further be configured to reflect a second subset of photons from the first linear polarized wave. The second subset of photons may have a polarization that is unaligned with the first PBS 150. The first PBS 150 may be configured to reflect the second subset of photons orthogonally to the first subset of photons.

The second PBS 160 may be configured to pass in line a third subset of photons from the second linear polarized wave where the third subset of photons has a polarization that is aligned with the second PBS 160. The second PBS 160 may further be configured to reflect a fourth subset of photons from the second linear polarized wave where the fourth subset of photons has a polarization that is unaligned with the second PBS 160. The second PBS 160 may be configured to reflect the fourth subset of photons orthogonally to the third subset of photons.

Similarly, user spoke client 125 may comprise a third PBS 152 configured to pass in line a fifth subset of photons from the third linear polarized wave, the fifth subset of photons having a polarization aligned with the third PBS 152. Furthermore, the third PBS 152 may be configured to reflect a sixth subset of photons from the third linear polarized wave, the sixth subset of photons having a polarization that is unaligned with the third PBS 152. The third PBS 152 may be configured to reflect the sixth subset of photons orthogonally to the fifth subset of photons. The fifth and sixth subsets of photons may then be measured by polarization analyzers 170 of the user spoke client 135.

The user spoke client 125 may further comprise a fourth PBS 162 configured to pass in line a seventh subset of photons from the fourth linear polarized wave, the seventh subset of photons having a polarization aligned with the fourth PBS 162. Furthermore, the fourth PBS 162 may be configured to reflect an eighth subset of photons from the fourth linear polarized wave, the eighth subset of photons having a polarization that is unaligned with the fourth PBS 162. The fourth PBS 162 may be configured to reflect the eighth subset of photons orthogonally to the seventh subset of photons. The seventh and eighth subsets of photons may then be measured by polarization analyzers 170 of the user spoke client 135.

The polarization analyzers 170 may be configured to measure the respective polarization of at least one of the first and second subsets of photons and the third and fourth subsets of photons. More particularly, the polarization analyzers 170 may be configured to determine a first photon correlation state, defined as one of 100% correlation and 100% anti-correlation, between the respective polarizations between the first subset of photons and the second subset of photons. Accordingly, a complete measurement on the states of the photons 111, 112 is accomplished. Polarization degrees of freedom arriving at random to the user spoke clients 125, 135 are correlated or anti-correlated when measured in the same frame of reference at their distinct locations, whereas frequency degrees of freedom are always anti-correlated.

In at least one of the user spoke clients 125, 135 the polarization analyzers 170 may be electrically coupled to a processor 172. Additionally, the polarization analyzers 170 may be operable to output to the processor 172 a signal indicating the photon correlation state measured thereby. The processor 172 may be operable to determine a bit stream responsive to signals received from the polarization analyzers 170. In some embodiments, 100% correlation may be represented by a "1" in the bit stream and 100% anti-correlation may be represented by a "0" in the bit stream. The processor 172 may further be coupled to any computerized device or hardware that is operable to output the bit stream to a remote computerized device.

On average, each user spoke client 125, 135 will receive one photon half the time, while half the time each user will receive both photons. The former events are termed anti-bunched events. They are the primary bit strings from which shared secret keys are derived. The latter events are termed bunched events. Superficially, bunched events seem useless when engendering a shared key between the two users. However, each user spoke client 125, 135 can make local correlations determining the integrity and confidentiality of the channel between him and the hub. Adversity in the anti-bunched events shows up under error correction when the expected correlations suffer too much discordance due to nature or an adversary attempting intrusion. Error profiles fused from discordant correlations in both anti-bunched and bunched events accomplish thereby gain enhanced situational awareness of the environment and its adversity to secure communications.

Because the basis in which polarization is measured may differ between the user spoke clients 125, 135 equation 3 utilizes lower case symbols to emphasize that the equation is given in terms of measurement bases parametrized by two angles. The photon states may be represented in the following way:

$$|\Psi_{>PBS}\rangle = \frac{1}{2\sqrt{2}}(|s_1, a, 0\rangle|s_2, 0, b\rangle - |p_1, a, 0\rangle|p_2, 0, b\rangle +$$

$$|s_1, 0, b\rangle|s_2, a, 0\rangle - |p_1, 0, b\rangle|p_2, a, 0\rangle)\sin(\theta_a + \theta_b) +$$

$$\frac{1}{2\sqrt{2}}(|s_1, a, 0\rangle|p_2, 0, b\rangle + |p_1, a, 0\rangle|s_2, 0, b\rangle +$$

$$|s_1, 0, b\rangle|p_2, a, 0\rangle + |p_1, 0, b\rangle|s_2, a, 0\rangle)\cos(\theta_a + \theta_b) -$$

$$\frac{1}{2\sqrt{2}}((|s_1, a, 0\rangle|p_2, a, 0\rangle + |p_1, a, 0\rangle|s_2, a, 0\rangle)\cos(2\theta_a) +$$

$$(|p_1, 0, b\rangle|s_2, 0, b\rangle + |s_1, 0, b\rangle|p_2, 0, b\rangle)\cos(2\theta_b)) -$$

$$\frac{1}{2\sqrt{2}}((|s_1, a, 0\rangle|s_2, a, 0\rangle - |p_1, a, 0\rangle|p_2, a, 0\rangle)\sin(2\theta_a) +$$

$$(|s_1, 0, b\rangle|s_2, 0, b\rangle - |p_1, 0, b\rangle|p_2, 0, b\rangle)\sin(2\theta_b))$$

Equation 3

The upper two terms are anti-bunched states, while the lower two are bunched states. When authorized users agree to measure in the same basis, equation 3 simplifies to the following equation 4:

$$|\Psi_{>PBS}\rangle = \frac{\sin(2\delta)}{2\sqrt{2}}(|s_1, a, 0\rangle|s_2, 0, b\rangle - |p_1, a, 0\rangle|p_2, 0, b\rangle +$$

$$|s_1, 0, b\rangle|s_2, a, 0\rangle - |p_1, 0, b\rangle|p_2, a, 0\rangle) +$$

$$\frac{\cos(2\delta)}{2\sqrt{2}}(|s_1, a, 0\rangle|p_2, 0, b\rangle + |p_1, a, 0\rangle|s_2, 0, b\rangle +$$

$$|s_1, 0, b\rangle|p_2, a, 0\rangle + |p_1, 0, b\rangle|s_2, a, 0\rangle) -$$

$$\frac{\cos(2\delta)}{2\sqrt{2}}(|s_1, a, 0\rangle|p_2, a, 0\rangle + |p_1, a, 0\rangle|s_2, a, 0\rangle +$$

$$|p_1, 0, b\rangle|s_2, 0, b\rangle + |s_1, 0, b\rangle|p_2, 0, b\rangle) -$$

$$\frac{\sin(2\delta)}{2\sqrt{2}}(|s_1, a, 0\rangle|s_2, a, 0\rangle - |p_1, a, 0\rangle|p_2, a, 0\rangle +$$

$$|s_1, 0, b\rangle|s_2, 0, b\rangle - |p_1, 0, b\rangle|p_2, 0, b\rangle).$$

Equation 4

Figure 2B:
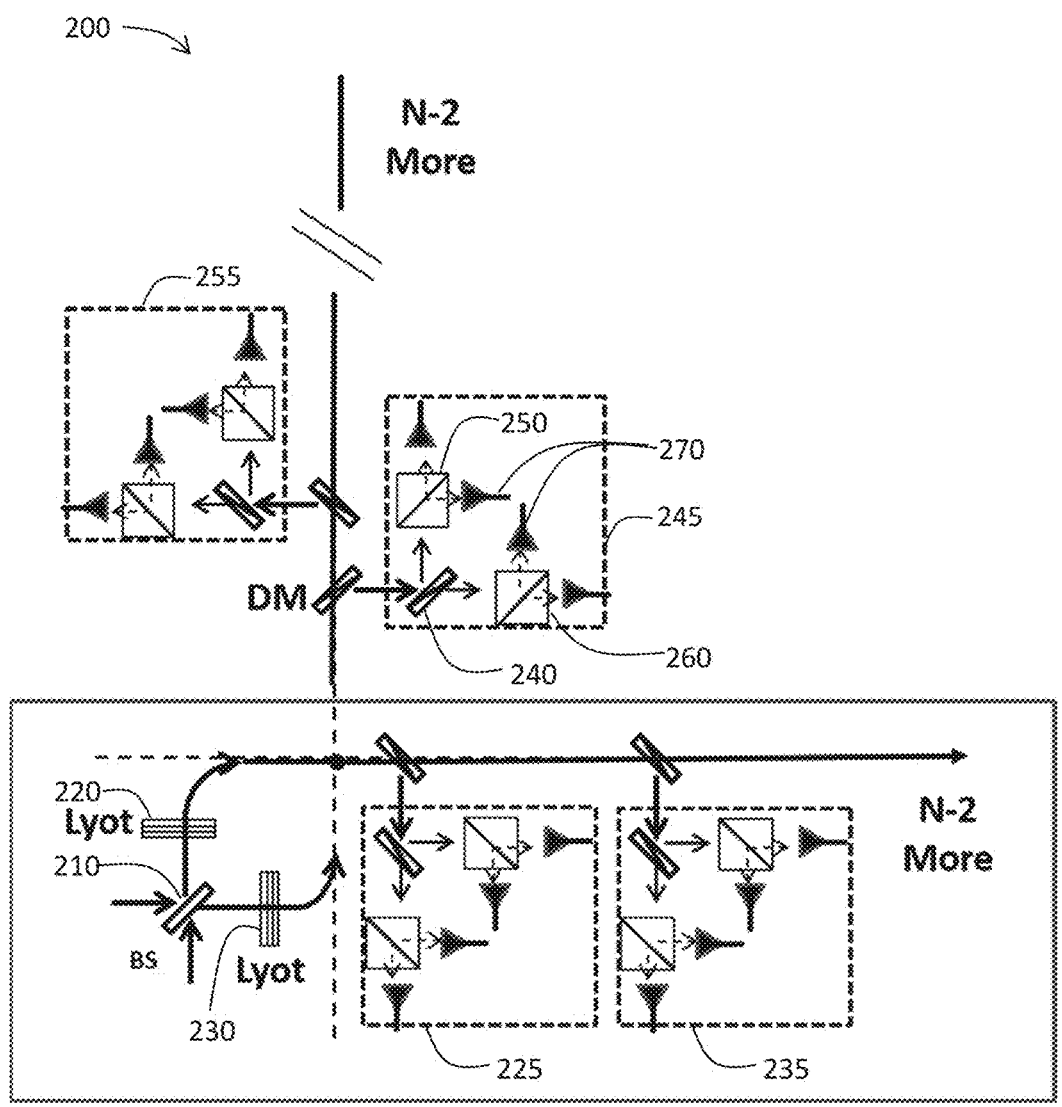
FIG. 2B is a schematic block diagram of a second exemplary quantum computer system employing hyperentangled photons according to an embodiment of the present invention

Referring now to FIG. 2B, an LQOS 200 according to an embodiment of the invention is presented. The LQOS 200 may comprise any number of user spoke clients 245, 255 and a hub server comprising an NBS 210, Lyot filters 220, 230 identical to those of hub server 100 of FIG. 2A, and any number of session key clients 225, 235. The LQOS 200 may retain one photon of a photon pair at one or more session key clients 225, 235 while sending the other photon of the photon pair to one or more user spoke clients 245, 255. The photon pairs may engender a bit stream as described hereinabove, serving as a session key between the hub server and the user spoke clients 245, 255 for future communications there between. In doing so, one fourth the time the hub server will retain bunched states, the other fourth retained by the user spoke clients 245, 255. This will occur, on average, for user spoke clients 245, 255. The hub server thus shares N distinct session keys with N distinct user spoke clients. Each session key can encrypt key material stored by the hub server in its local bunched state events. That material can be made common to all user spoke clients using their respective hub-to-spoke session keys. The resultant shared keys can then be used to seed stream ciphers common to all N+1 members of a mesh network. Each member in the mesh can act as a hub server to all others, if point-to-point links can be established.

Figure 3:
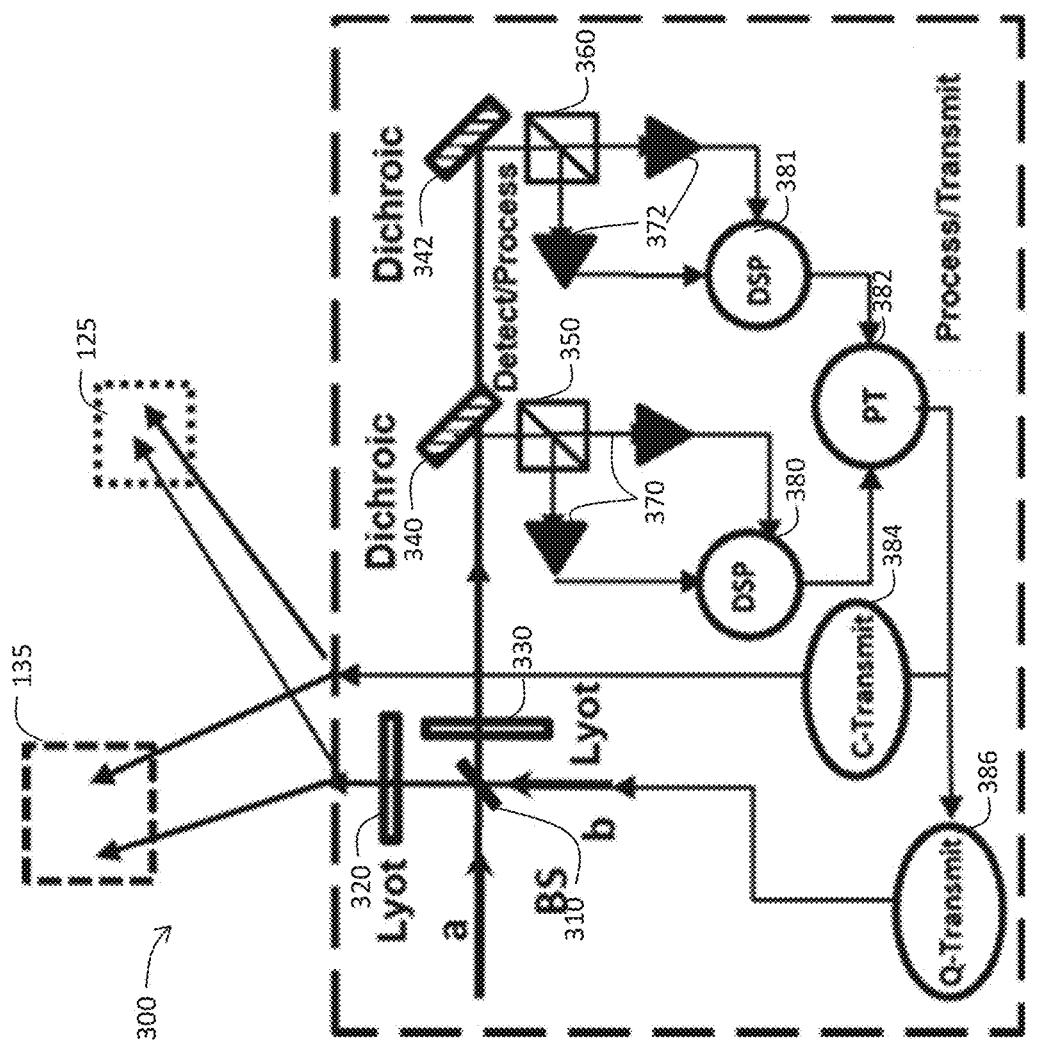
FIG. 3 is a schematic block diagram of an exemplary component architecture of the quantum computer system of FIG. 2.

Referring now to FIG. 3, a hub server 300 according to an embodiment of the inventions is presented. The hub server 300 may comprise an NBS 310 and first and second Lyot filters 320, 330 similar to the hub server 100 of FIG. 2a. The NBS 310 may be operable to receive a hyperentangled photon pair entangled, illustrated as "a" and "b" in FIG. 3, in a plurality of degrees of freedom including polarization, non-degenerate frequency, and path and spatially separate output probability amplitudes for the non-degenerate frequencies of the hyperentangled photon pair into a first set of anti-bunched rotationally invariant amplitude states and a second set of bunched rotationally invariant amplitude states. The second Lyot filter 330 may be configured to rotate the respective polarization of congruent frequency states in the second set of bunched rotationally invariant amplitude states and preserve the respective polarization of congruent frequency states in the second set of bunched rotationally invariant amplitude states, to define a second set of bunched non-rotationally invariant amplitude states.

The hub server 300 may further comprise a first dichroic mirror 340 configured to operate as a frequency filter and spatially separate the first set of bunched non-rotationally invariant amplitude states by the non-degenerate frequencies of the hyperentangled photon pair, thereby defining a first linear polarized wave and a second linear polarized wave.

The hub server 300 may further comprise a first PBS 350 configured to receive the first linear polarized wave and pass in line a first subset of photons from the first linear polarized wave having a polarization aligned with the first PBS 350 and reflect a second subset of photons from the first linear polarized wave having a polarization unaligned with the first PBS 350, in some embodiments reflecting the second subset of photons orthogonally to the first subset of photons. The hub server 300 may further comprise a first plurality of polarization analyzers 370 configured to measure the respective polarizations of the first and second subsets of photons. The first plurality of polarization analyzers 370 may be configured to output a signal to a first digital signal processor (DSP) 380 that is operable to process and transmit those output signals, defining a first DSP output to a process/transmit device (PT) 382 (together, with the DSP 380, defining an information processing and control (IPC) module) that is then operable to process first DSP output to a PT output and transmit the PT output to a transceiver, which may comprise at least one of a classical transmission device 384 and a quantum transmission device 386. The classical transmission device 384 may be operable to transmit the output received from the PT 382 to one or more user spoke clients 125, 135. The quantum transmission device 386 may be operable to transmit the output received from the PT 382 to the NBS 310 for separation of output probability amplitudes as described hereinabove.

The hub server 300 may further comprise a second dichroic mirror 342 configured to operate as a frequency filter, having different properties (and passing different frequencies) as compared with first dichroic mirror 340, and to reflect the second linear polarized wave to a second PBS 360 comprised by the hub server 300. The second PBS 360 may be configured to receive the second linear polarized wave and pass in line a third subset of photons from the second linear polarized wave having a polarization aligned with the second PBS 360 and reflect a fourth subset of photons from the second linear polarized wave having a polarization unaligned with the second PBS 360, in some embodiments reflecting the fourth subset of photons orthogonally to the third subset of photons. The hub server 300 may further comprise a second plurality of polarization analyzers 372 configured to measure the respective polarizations of the third and fourth subsets of photons. The second plurality of polarization analyzers 372 may be configured to output a signal to a second DSP 382 (together, with the PT 382 and the first DSP 380, further defining the IPC) that is operable to process and transmit those output signals, defining a second DSP output to the PT 382 that is then operable to process second DSP output to a PT output and transmit the PT output to at least one of a classical transmission device 384 and a quantum transmission device 386, which both perform as previously described.

Figure 4:
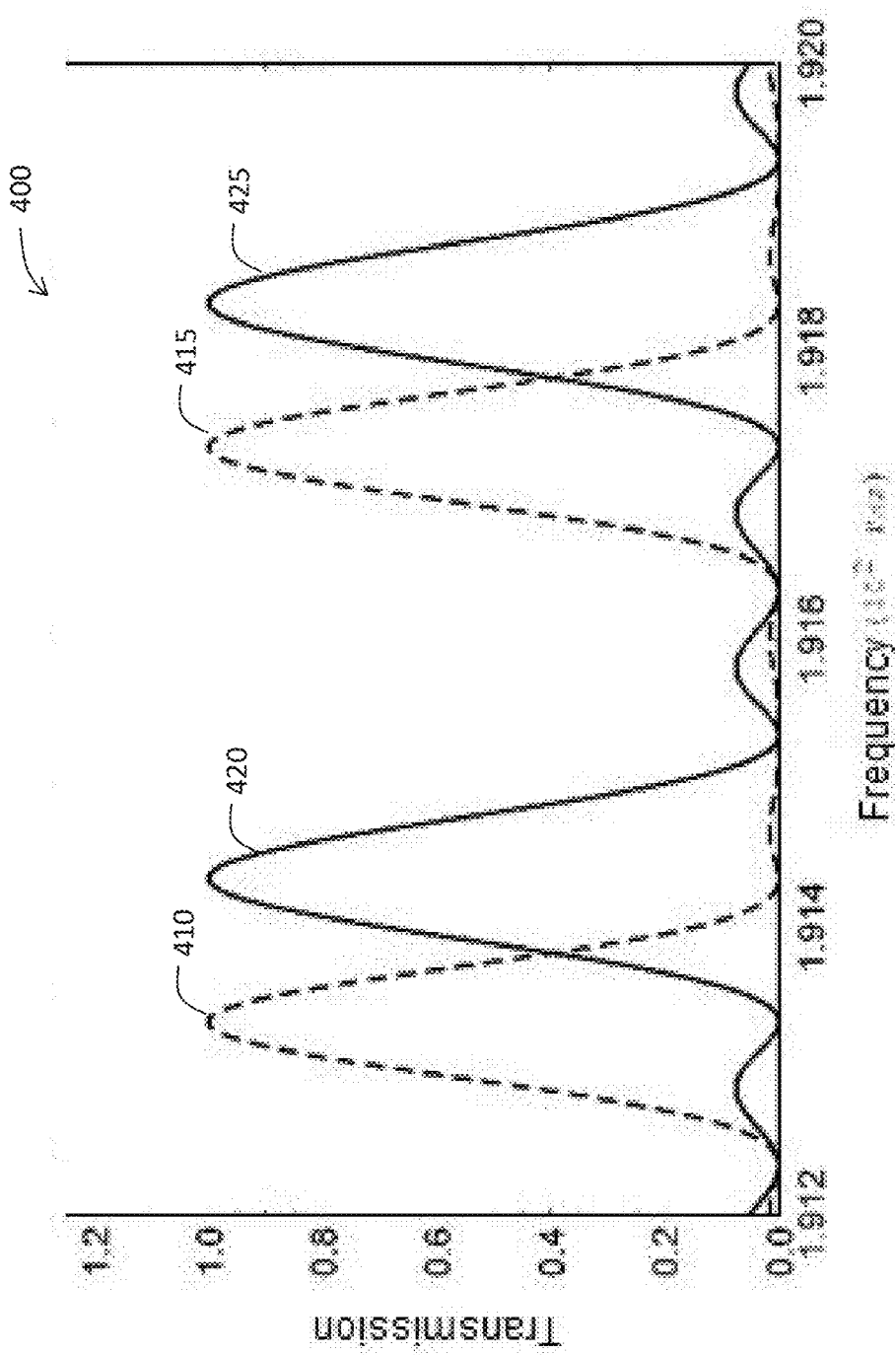
FIG. 4 is a graph of exemplary non-degenerate frequencies as used by an exemplary quantum computer system according to an embodiment of the present invention.

Referring now to FIG. 4, a graph 400 of exemplary non-degenerate frequencies as used by an exemplary quantum computer system according to an embodiment of the present invention is presented. Congruent frequencies 420, 425 are denoted by the solid lines, incongruent frequencies 410, 415 by the dotted lines. If the dichroic mirrors described in the various embodiments hereinabove have sufficient resolution, they can be discriminated inter-pair-wise and then intra-pairwise. Other frequencies shifted from the above frequencies can also be used for the mesh network multiplicity, i.e., FIG. 4 is an example of non-degenerate frequencies that can be used in the hyper-entangled photon server.

Figure 5:
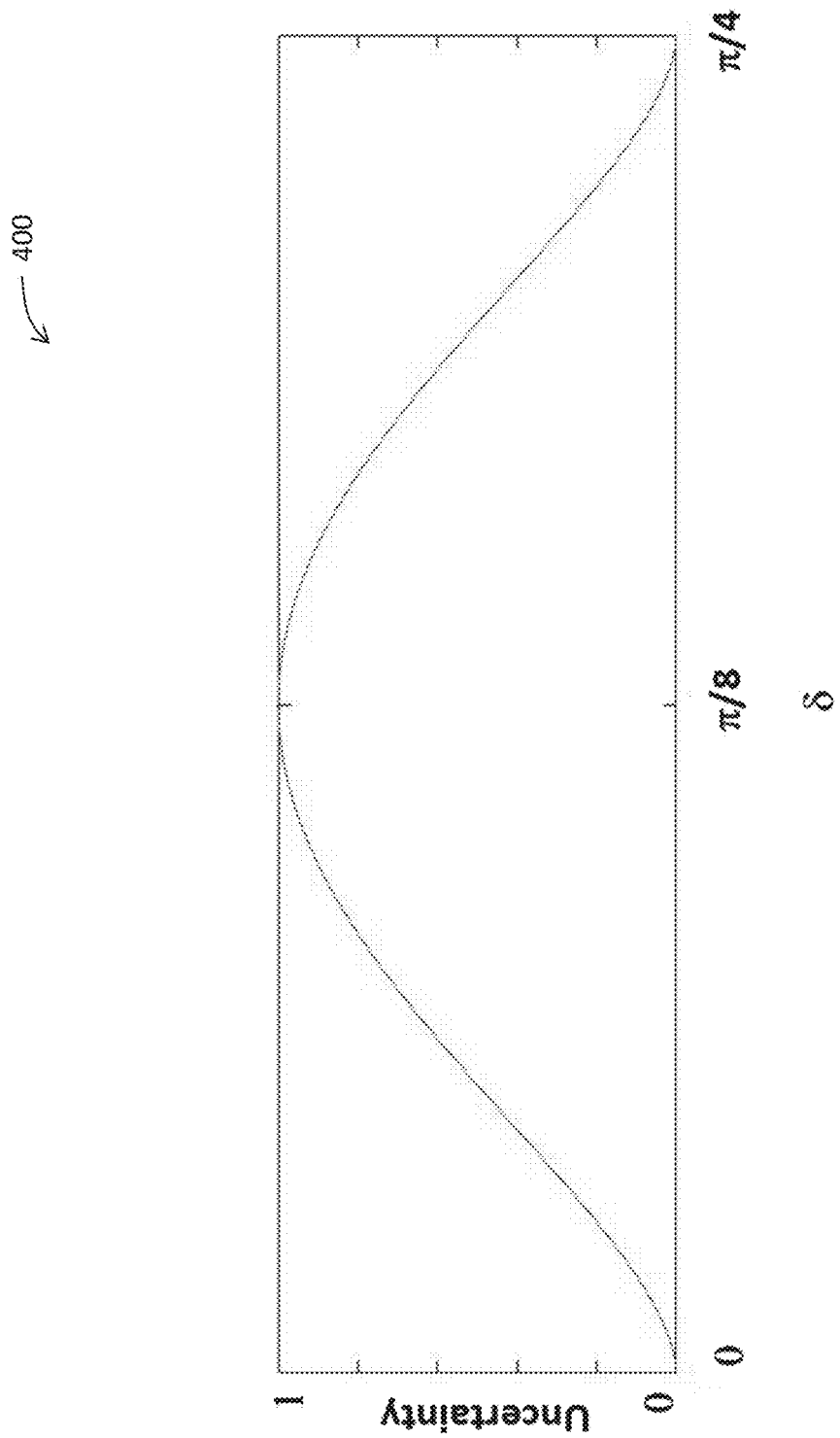
FIG. 5 is a graph of uncertainty in shared polarization correlations as measured in various frames of reference by an exemplary quantum computer system according to an embodiment of the present invention.

Referring now to FIG. 5, a graph 500 of uncertainty in shared polarization correlations as measured in various frames of reference by an exemplary quantum computer system according to an embodiment of the present invention is depicted.

Though the user spoke clients described hereinabove agree to measure in the same frame of reference, uncertainty in shared polarization correlations in which to assign shared logical bits for storage and subsequent use still exists. The optimal choice they have for correlation agreement is when they choose either $\delta=\pi/4$ or $\delta=0$. Choosing $\delta=0$, anti-correlated polarizations will be measured. When $\delta=\pi/4$, correlated polarizations will be measured. These events will occur at random, and are described by the first two terms in equation 4, the anti-bunched contributions. For example, suppose measurements are determined to be made in $\delta=\pi/4$, and a measures $p_1$. In the absence of loss, b must have measured $p_2$. This is the power of entanglement. It allows inference. Similarly, if $\delta=0$ is the common frame of reference, when b measures $s_1$, a measures $p_2$. Frequencies are always anti-correlated in their random arrivals. The cumulative appending of their correlated measurements and logical assignments thereof allows for a random bit stream to be used as a key to seed stream ciphers in all communication applications, RF to optical.

On average user spoke clients will receive anti-bunched states one half the time. These events form the core of the shared bit stream used for keys. Errors found in their shared bit stream allow a common operating picture of the global link integrity. The other half the time each user spoke client will receive both photons. This allows each user spoke client to perform complete measurements on the entanglement integrity of the link, enhancing their situational awareness within the link when communicating via a secure classical channel. Since these bunched events also occur at random, they can be used in post processing to further mix up the sifted random stream already shared by the users in the anti-bunched events.

As stated above, however, in the mesh network multi-user configuration, the stored measurements in the current hub server can act as a global key to be shared among the user spoke clients and conveyed to them via anti-bunched session keys. User spoke clients are authorized by reference frame knowledge shared between them and the hub server. Once that reference frame is established for each use of the common channel, the user spoke clients rotate their analyzers to a shared daughter reference frame known only by them, and not necessarily by the hub server—unless the hub server is part of a mesh network and therefore also a user spoke client communicating with N other users.

Generalized Bell states, termed Bell forms, in equation 2 are rotationally invariant. The post-Lyot Bell forms have been transformed into rotationally non-invariant Bell forms, which set up the two valued polarization correlations, 100% correlated for $\delta=\pi/4$ and 100% anti-correlated for $\delta=0$ in the anti-bunched events wherein two user spoke clients (e.g. user spoke clients of FIG. 2A or FIG. 2B) receive one photon. However, because of the hyper-entanglement between frequency, polarization, and path, bunched states, too, can exhibit the two types of polarization correlations if the user spoke client at a receives both photons, but splits them frequency-wise into two sub-paths a' and b'. Measuring resultant arrivals in either of the two optimal bases, 0 or $\pi/4$, will reveal 100% anti-correlation or 100% correlation respectively. If not, the discordance in expected correlations is due to interference by nature or by an adversary who is ignorant of the current operative basis choices, the authenticating primary reference frame between hub and servers, and the secondary correlation basis between the two receivers. Legitimate user spoke clients may either rectify basis agreement post reception events or pre-reception via Keyed Communication in Quantum noise, also termed KCQ.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method for creating measurements of photons at distinct locations, comprising:
  receiving, using a non-polarizing beam splitter (BS), electromagnetic (EM) radiation comprising a hyperentangled photon pair, defined as a first photon and a second photon entangled in a plurality of degrees of freedom including polarization, frequency, and path, wherein frequency is non-degenerate;
  spatially separating, using the BS, output probability amplitudes for the non-degenerate frequencies of the hyperentangled photon pair into a first set of anti-bunched rotationally invariant amplitude states and a second set of bunched rotationally invariant amplitude states,
  rotating, using a first Lyot filter, the respective polarization of incongruent frequency states in the first set of anti-bunched rotationally invariant amplitude states, to define a first set of anti-bunched non-rotationally invariant amplitude states;
  preserving, using the first Lyot filter, the respective polarization of congruent frequency states in the first set of anti-bunched rotationally invariant amplitude states, to further define the first set of anti-bunched non-rotationally invariant amplitude states;
  spatially separating, using a first dichroic mirror (DM), the first set of anti-bunched non-rotationally invariant amplitude states by the non-degenerate frequencies of the hyperentangled photon pair, to define a first linear polarized wave and a second linear polarized wave;
  passing in line, using a first polarizing beam splitter (PBS), a first subset of photons from the first linear polarized wave, each having a polarization aligned with the first PBS;
  reflecting orthogonally, using the first PBS, a second subset of photons from the first linear polarized wave, each having a polarization unaligned with the first PBS; and
  measuring, using a first polarization analyzer, the respective polarization of at least one of the first subset of photons and the second subset of photons.

2. The method according to claim 1 wherein rotating the polarizations comprises rotating, using the first Lyot filter, the respective polarization of the incongruent frequency states in the first set of anti-bunched rotationally invariant amplitude states by 90 degrees.

3. The method according to claim 1 wherein measuring the polarizations comprises determining a first photon correlation state, defined as one of 100% correlation and 100% anti-correlation between the respective polarizations of the first subset of photons and the second set of photons.

4. The method according to claim 1 further comprising:
  passing in line, using a second polarizing beam splitter (PBS), a third subset of photons from the second linear polarized wave, each having a polarization aligned with the second PBS;
  reflecting orthogonally, using the second PBS, a fourth subset of photons from the second linear polarized wave, each having a polarization unaligned with the second PBS; and
  measuring, using a second polarization analyzer, the respective polarization of at least one of the third subset of photons and the fourth subset of photons.

5. The method according to claim 1 further comprising:
  rotating, using a second Lyot filter, the respective polarization of congruent frequency states in the second set of bunched rotationally invariant amplitude states, to define a second set of bunched non-rotationally invariant amplitude states;
  preserving, using the second Lyot filter, the respective polarization of congruent frequency states in the second set of bunched rotationally invariant amplitude states, to further define the second set of bunched non-rotationally invariant amplitude states;
  spatially separating, using a second dichroic mirror (DM), the second set of bunched non-rotationally invariant amplitude states by the non-degenerate frequencies of the hyperentangled photon pair, to define a third linear polarized wave and a fourth linear polarized wave;
  passing in line, using a third polarizing beam splitter (PBS), a fifth subset of photons from the third linear polarized wave, each having a polarization aligned with the third PBS;
  reflecting orthogonally, using the third PBS, a sixth subset of photons from the third linear polarized wave, each having a polarization unaligned with the third PBS; and
  measuring, using a third polarization analyzer, the respective polarization of at least one of the fifth subset of photons and the sixth subset of photons.

6. The method according to claim 5 further comprising:
  passing in line, using a fourth polarizing beam splitter (PBS), a seventh subset of photons from the fourth linear polarized wave, each having a polarization aligned with the fourth PBS;
  reflecting orthogonally, using the fourth PBS, an eighth subset of photons from the fourth linear polarized wave, each having a polarization unaligned with the fourth PBS; and
  measuring, using a fourth polarization analyzer, the respective polarization of at least one of the seventh subset of photons and the eighth subset of photons.

7. A linear optical quantum computing (LOQC) system comprising:
  a hub server comprising:
    a non-polarizing beam splitter (BS) configured to:
      receive electromagnetic (EM) radiation comprising a hyperentangled photon pair, defined as a first photon and a second photon entangled in a plurality of degrees of freedom including polarization, frequency, and path, wherein frequency is non-degenerate; and
      spatially separate output probability amplitudes for the non-degenerate frequencies of the hyperentangled photon pair into a first set of anti-bunched rotationally invariant amplitude states and a second set of bunched rotationally invariant amplitude states;
    a first Lyot filter configured to rotate the respective polarization of incongruent frequency states in the first set of anti-bunched rotationally invariant amplitude states and preserve the respective polarization of congruent frequency states in the first set of anti-bunched rotationally invariant amplitude states, to define a first set of anti-bunched non-rotationally invariant amplitude states; and
  at least one spoke client comprising:
    a dichroic mirror configured to spatially separate the first set of anti-bunched non-rotationally invariant amplitude states by the non-degenerate frequencies of the hyperentangled photon pair, to define a first linear polarized wave and a second linear polarized wave;
  a polarizing beam splitter (PBS) configured to:
    pass in line a first subset of photons from the first linear polarized wave, each having a polarization aligned with the PBS; and
    reflect orthogonally a second subset of photons from the first linear polarized wave, each having a polarization unaligned with the PBS; and
  a polarization analyzer configured to measure the respective polarization of at least one of the first subset of photons and the second subset of photons.

8. The LOQC system according to claim 7 wherein the first Lyot filter is configured to rotate the respective polarization of the incongruent frequency states in the first set of anti-bunched rotationally invariant amplitude states by 90 degrees.

9. The LOQC system according to claim 7 wherein the respective polarization analyzer of the at least one spoke client is configured to determine a first photon correlation state, defined as one of 100% correlation and 100% anti-correlation between the respective polarizations of the first subset of photons and the second set of photons.

10. The LOQC system according to claim 7 wherein the hub server further comprises a second Lyot filter configured to:
  rotate the respective polarization of congruent frequency states in the second set of bunched rotationally invariant amplitude states and preserve the respective polarization of congruent frequency states in the second set of bunched rotationally invariant amplitude states, to define a second set of bunched non-rotationally invariant amplitude states;
  wherein the respective dichroic mirror of the at least one spoke client is further configured to spatially separate the second set of bunched non-rotationally invariant amplitude states by the non-degenerate frequencies of the hyperentangled photon pair, to define a third linear polarized wave and a fourth linear polarized wave;
  wherein the respective PBS of the at least one spoke client is further configured to:
    pass in line a third subset of photons from the third linear polarized wave, each having a polarization aligned with the PBS; and
    reflect orthogonally a fourth subset of photons from the third linear polarized wave, each having a polarization unaligned with the PBS; and
  wherein the respective polarization analyzer of each of the at least one spoke client is further configured to measure the respective polarization of at least one of the third subset of photons and the fourth subset of photons.

11. The LOQC system according to claim 7 wherein at least one of the plurality of spoke clients is configured to determine a bit stream using the photon correlation state, wherein the 100% correlation represents a '1' in the bit stream and the 100% anti-correlation represents a '0' in the bit stream.

12. The LOQC system according to claim 7 further comprising a tunable entangled pair source configured to generate the EM radiation.

13. The LOQC system according to claim 12 wherein the tunable entangled pair source is a pump beam passing through a fiber.

14. The LOQC system according to claim 7 wherein the hub server further comprises a transceiver and an information processing and control (IPC) module.

15. The LOQC system according to claim 14 wherein the transceiver is of a type selected from the group consisting of classical (C) and quantum (Q).

16. The LOQC system according to claim 7 wherein the EM radiation is of an electromagnetic radiation type selected from the group consisting of radio waves, microwaves, infrared, visible light, ultraviolet (UV), X-, and gamma radiation.

17. A hub server apparatus comprising:
  a non-polarizing beam splitter (NBS) including a first output, a second output, and an input comprising a first port and a second port, wherein the NBS is configured to:
    receive, using the input of the NBS, a hyperentangled photon pair, defined as a first photon and a second photon entangled in a plurality of degrees of freedom including polarization, frequency, and path, wherein frequency is non-degenerate; and
    spatially separate output probability amplitudes for the non-degenerate frequencies of the hyperentangled photon pair into a first set of anti-bunched rotationally invariant amplitude states and a second set of bunched rotationally invariant amplitude states;
  a first Lyot filter optically coupled with said first output and a second Lyot filter optically coupled with said second output, wherein the first and second Lyot filters are configured to:
    rotate the respective polarization of incongruent frequency states in the first set of anti-bunched rotationally invariant amplitude states and preserve the respective polarization of congruent frequency states in the first set of anti-bunched rotationally invariant amplitude states, to define a first set of anti-bunched non-rotationally invariant amplitude states; and
    rotate the respective polarization of congruent frequency states in the second set of bunched rotationally invariant amplitude states and preserve the respective polarization of congruent frequency states in the second set of bunched rotationally invariant amplitude states, to define a second set of bunched non-rotationally invariant amplitude states.

18. The hub server apparatus according to claim 17 further comprising a a polarizing beam splitter (PBS) having a first input, a second input, a first output and a second output;
  wherein said first and second inputs of the PBS are orthogonal to each other and wherein said first and second outputs of the PBS are orthogonal to each other; and
  wherein the PBS is configured to:
    transform the first set of anti-bunched non-rotationally invariant amplitude states to a first set of bunched non-rotationally invariant amplitude states; and
    transform the second set of bunched non-rotationally invariant amplitude states to a second set of anti-bunched non-rotationally invariant amplitude states.

19. The hub server apparatus according to claim 18 wherein the PBS is a first PBS, the hub server further comprising a second PBS configured to receive a signal having a different frequency than a signal received by the first PBS.

20. The hub server apparatus according to claim 19, further comprising first and second digital signal processors receiving the output of the first and second PBS, respectively, and wherein the output of the first and second digital signal processors outputs to a process/transmit device.

* * * * *